United States Patent

Holton

[15] 3,683,337

[45] Aug. 8, 1972

[54] INFORMATION STORAGE BY CHANGING THE VALENCE STATE OF A SEMI-CONDUCTOR CRYSTAL

[72] Inventor: William C. Holton, Dallas, Tex.

[73] Assignee: Texas Instrument Incorporated, Dallas, Tex.

[22] Filed: Nov. 24, 1969

[21] Appl. No.: 879,263

[52] U.S. Cl. .....340/173 CC, 340/173 LS, 350/160 R

[51] Int. Cl. .......G11c 11/34, G11c 13/04, G02f 1/36

[58] Field of Search ..........340/173, 173 CC, 173 LS; 350/160 R, 160 P; 148/1.6; 252/62.3

[56] References Cited

UNITED STATES PATENTS

| | | | |
|---|---|---|---|
| 2,953,454 | 9/1960 | Berman | 340/173 CC |
| 2,979,467 | 4/1961 | Keller | 252/301.4 S |
| 3,253,497 | 5/1966 | Dreyer | 340/173 CC |
| 3,341,825 | 9/1967 | Schrieffer | 340/173 CC |
| 3,383,664 | 5/1968 | Chen | 340/173 CC |
| 3,480,918 | 11/1969 | Benson | 340/173 CC |
| 3,508,208 | 4/1970 | Duguay | 340/173 R |
| 3,566,371 | 2/1971 | Barnes | 340/173 LM |

OTHER PUBLICATIONS

Allen, Transition Metal Impurities in Semiconductors, 6/67, Solid-State Electronics Lab., Stanford Electronics Labs., Stanford U., TR No. 5115- 1 Accession No. N67- 34740, NASA CR- 87816, NASA Research Grant NsG- 555.

*Primary Examiner*—Howard W. Britton
*Assistant Examiner*—Stuart Hecker
*Attorney*—Samuel M. Mims, Jr., James O. Dixon, Andrew M. Hassell, Harold Levine, Melvin Sharp, John E. Vandigriff and William E. Hiller

[57] ABSTRACT

An information storage system includes a semi-conductor crystal having deep level donors and multi-valent particles dispersed through it. Information is written into the system by subjecting the crystal to electro-magnetic radiation and thereby causing reciprocal changes in the valence states of the respective donors and multi-valent particles. Information is read by subjecting the crystal to radiation that is absorbed by ions in one of the valence states.

9 Claims, 4 Drawing Figures

INVENTOR
WILLIAM C. HOLTON

INFORMATION STORAGE BY CHANGING THE VALENCE STATE OF A SEMI-CONDUCTOR CRYSTAL

BACKGROUND OF THE INVENTION

Heretofore, information storage systems have included various storage devices such as relays and transistors; magnetic and paper tapes; ferrite cores, etc. Such devices have a common characteristic: they are all binary in nature. For this reason, most of the presently available information storage systems are incapable of storing non-digital information.

This invention relates to an information storage system in which multi-valent particles are incorporated into a semi-conductor crystal. Information is written into the system by selectively changing the valence state of the particles. Information is read by subsequently determining the valence state. Preferably, both writing and reading are accomplished by means of electromagnetic radiation.

The individual particles of the present information storage system can be considered binary in nature in that each particle has a limited number of discreet valence states. However, it has been found that when a relatively large number of particles is dispersed throughout the crystal, it is possible to change a predetermined percentage of the particles from one valence state to another. By this means, the particles can be used to store non-digital information, such as the output of an analog device.

The average distance between adjacent multi-valent ions within a crystal is extremely small. This permits the system to store images from photographs and holograms with very high resolution. Also, the valence state of the ions in a particular region of the crystal does not influence the valence state of the ions in adjacent regions. For this reason, a single crystal can be used to store a plurality of analog and/or binary information bits. Finally, an entire crystal can be employed as a binary storage device, if desired.

SUMMARY OF THE INVENTION

In accordance with the preferred embodiment of the invention, an information storage system comprises a semi-conductor crystal having multi-valent particles incorporated in it. Information is written into and is read from the system by selectively changing and determining the valence state of the ions, respectively. Preferably, electromagnetic radiation is employed both to write and to read information.

DESCRIPTION OF THE DRAWING

A more complete understanding of the invention may be had by referring to the following detailed description when taken in conjunction with the drawing wherein.

DETAILED DESCRIPTION

Figure 1:
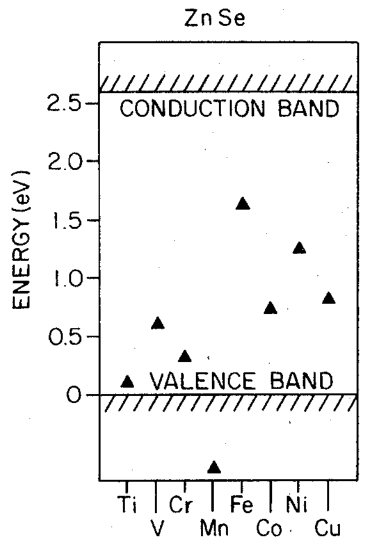
FIG. 1 is a chart illustrating various embodiments of the invention.

In accordance with the preferred embodiment of the invention, an information storage system includes storage members comprised of semi-conductor crystals having multi-valent impurity particles incorporated into them. Although any semi-conductor crystal may be used, crystals comprising the reaction products of elements in Groups II B and VI A and crystals comprising the reaction products of elements in groups III A and V A of the Periodic Table shown in page B–2 of the "Handbook of Chemistry and Physics" published by the Chemical Rubber Company (45th Edition, 1964) are preferred. More particularly, crystals comprised of zinc or cadmium and sulfur, selenium or tellurim and crystal comprised of aluminum or gallium and phosphorous or arsenic are preferably employed in the practice of the invention.

The particles of the storage members may comprise any multi-valent ion or radical so long as its size is convenient for incorporation into the crystals. The particles may also comprise more complicated defect centers, such as groups of ions, radicals and/or molecules that are physically associated within the crystal. However, the use of the metals in Period 4 of the Periodic Table having multi-valent ions, specifically titanium, vanadium, chromium, manganese, iron, cobalt, nickel, and copper, is preferred. Because manganese is highly stable in the +2 valence state, the use of ions other than manganese ions as particles in crystals including elements from Group II B of the Periodic Table is preferred. Likewise, because iron is highly stable in the +3 valence state, the use of other ions in crystals including elements from Group III A of the Periodic Table is preferred. Otherwise, ions of any of the elements set forth above may be employed in any semi-conductor crystal.

In the use of the information storage system, information is stored by controlling the valence state of the particles of the storage members. Valence state control in the storage members is facilitated by incorporating either a deep electron donor or a deep hole donor into the crystal along with the multi-valent particles. Both the particles and the donors are preferably incorporated into the crystal by one of the impurity doping techniques commonly employed in the manufacture of transistors and the like. The particles are preferably present in the crystal in a ratio of about 0.01 – 0.1 percent particles.

It has been found that when multi-valent particles and donors are incorporated into a semi-conductor crystal, the valence state of the particles can be controlled by subjecting the crystal to electromagnetic radiation. That is, by directing radiation having a first wave length through the crystal, the particles are caused to assume a first valence state. Then, by directing radiation having a second wave length through the crystal, the particles are caused to assume a second valence state. The particular wave length required in each case is dependent upon the particular semi-conductor crystal and the particular particle employed.

In a typical application of the invention, $Ni^{2+}$ and $Fe^{2+}$ ions are doped into a crystal comprised of zinc and sulphur. If the crystal is initially subjected to electromagnetic radiation having a wave length of 3,650 angstroms, both electrons and holes are created, thereby forming $Ni^{3+}$ and $Ni^{+}$ ions from the original $Ni^{2+}$ ions. Some of the holes are also trapped on the $Fe^{2+}$ ions to form $Fe^{3+}$ ions.

If a crystal so prepared is subsequently subjected to electromagnetic radiation having a wave length of 5,800 angstroms, holes are released from the $Fe^{3+}$ ions and are absorbed by the $Ni^{+}$ ions to form $Ni^{2+}$ ions. This radiation also releases some of the holes from the $Ni^{3+}$ ions, however, not to the extent that holes are released from the $F^{3+}$ ions. Therefore, 5,800 angstrom radiation increases the number of $Ni^{3+}$ ions in the crystal relative to the number of $Fe^{3+}$ ions therein.

The action of 5,800 angstrom radiation on the crystal can be reversed by subjecting the crystal to radiation having a wave length of 11,000 angstroms. Such radiation releases holes from the $Ni^{3+}$ ions in the crystal. The holes are trapped by the $Fe^{2+}$ ions to form $Fe^{3+}$ ions. Therefore, 11,000 angstrom radiation decreases the number of $Ni^{3+}$ ions in the crystal relative to the number of $Fe^{3+}$ ions therein.

The transfer of holes between $Ni^{3+}$ and $Fe^{3+}$ ions can be repeated as often as desired. That is, by alternately subjecting the crystal to radiation having a wave length of 5,800 angstroms and radiation having a wave length of 11,000 angstroms, the relative proportions of $Ni^{3+}$ ions and $Fe^{3+}$ ions in the ZnS crystal can be controlled. Thus, information can be stored in the crystal by controlling which of the two ions predominates. Of course, the original state of the crystal can be restored by subjecting the crystal to radiation having a wave length of 3,650 angstroms.

It has long been established that ions incorporated in semi-conductor crystals exhibit characteristic radiation absorption bands. Representative examples of such bands are set forth in the work by J. W. Allen and G. L. Pearson entitled "Transition Metal Impurities in Semiconductors" that was published by Stanford Electronics Laboratories under NASA Research Grant Number NSG–555 in June 1967 and that is identified as Technical Report Number 5115–1. This phenomenon is employed in the present invention to determine the valence state of multi-valent particles and thereby read information.

In the example given above, the Ni ions can be considered the particles and the Fe ions the donors. In such a case, the valence state of the particles can be determined either by subjecting the crystal to radiation that is absorbed by $Ni^{2+}$ ions or by subjecting the crystal to radiation that is absorbed by $Ni^{3+}$ ions. Alternately, the Fe ions can be considered the particles and the Ni particles the donors. In such a case, the valence state of the particles can be determined, either by subjecting the crystal to radiation that is absorbed by $Fe^{2+}$ ions or by subjecting the crystal to radiation that is absorbed by $Fe^{3+}$ ions.

For example, assume that the Fe ions are considered the particles and that it is desirable to investigate the storage member for the presence of $Fe^{3+}$ ions. In such a case, the crystal is subjected to radiation having a wave length of 8,000 angstroms. This radiation passes directly through the crystal unless $Fe^{3+}$ ions are present. That is, the amount of radiation that is absorbed by the crystal depends upon the percentage of $Fe^{3+}$ ions in the crystal. By this means, the valence state of the particles in the crystal is determined and, accordingly, information stored in the crystal by alternately subjecting the crystal to 5,800 angstrom and 11,000 angstrom radiation is read by subjecting the crystal to radiation having a wave length of 8,000 angstroms.

The valence state of the particles in a particular crystal can be also be determined magnetically. Each valence state of a particle has a distinctive paramagnetic resonance. Thus, the crystal can be determined by investigating the strength of the paramagnetic resonance of the crystal. In this manner, information written into a crystal by subjecting the crystal to radiation having a particular wave length can be read from the crystal.

Referring now to the drawing, FIG. 1 comprises a chart illustrating energy levels associated with various +2 valent ions in zinc-selenium crystals. The distance on the chart from the valence band to the point corresponding to a particular ion represents the energy necessary to change that ion from the +2 valence state to the +1 valence state. Similarly, the distance on the chart from the point corresponding to a particular ion to the conduction band represents the energy necessary to change the ion from the +2 valence state to the +3 valence state. The radiation wave length necessary to cause a particular ion to change from one valence state to another is related to the energy necessary to cause such a change by the formula $w =(hc)/e$ wherein $w$ is the wavelength, $h$ is the planck constant, $c$ is the speed of light and $e$ is the energy. Therefore, FIG. 1 comprises a chart of the wave lengths that must be directed through zinc-selenium crystals to cause particular ions in such crystals to change from one valence state to another.

It should be understood that the chart shown in FIG. 1 is useful only for zinc-selenium crystals and only for the particular ions set forth. That is, if either the crystal or the particular multi-valent particle in the crystal is changed, the wave length necessary to cause the particle to change from a particular valence state to another also changes. However, once a particular crystal and a particular multi-valent particle are chosen, the position of the particle on a chart similar to the chart shown in FIG. 1 is fixed and, accordingly, the wave lengths necessary to cause the particle to change from one valence state to another are known.

Figures 2, 3:
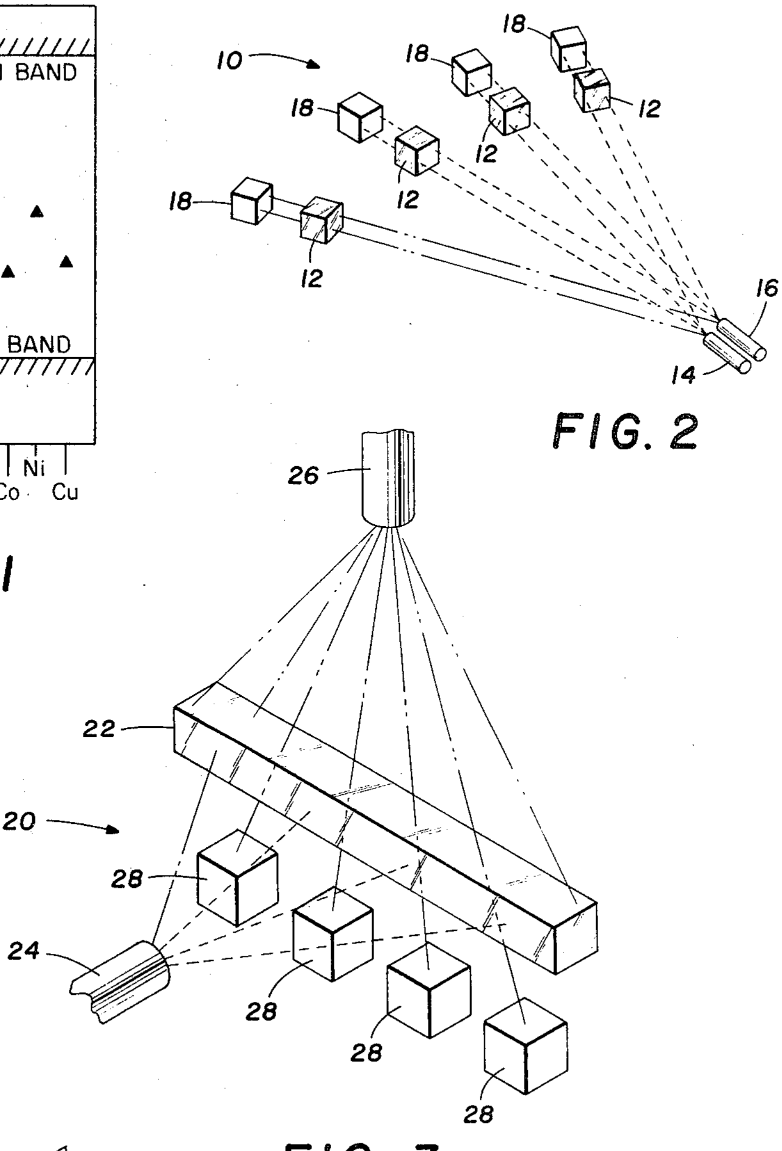
FIGS. 2, 3, and 4 are schematic illustrations of various information storage systems employing the invention.
Figure 4:
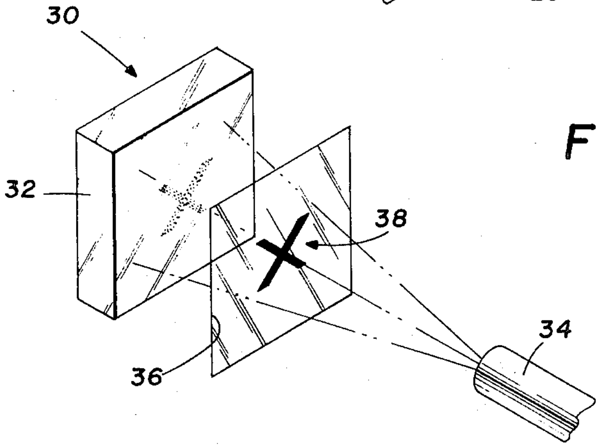

FIGS. 2, 3, and 4 comprise schematic illustrations of various information storage systems employing the invention. Referring first to FIG. 2, an information storage system 10 includes a plurality of storage members 12 each comprising a semi-conductor crystal having multi-valent particles dispersed through it. A writing radiation source 14 directs electromagnetic radiation through each of the members 12 in sequence. The source 14 is operated to subject the storage members 12 to radiation of two distinct wave lengths, one of which causes the particles in the crystals of the members 12 to assume a first valence state and the other of which causes the particles to assume a second valence state.

The system 10 further includes a reading radiation source 16. The source 16 directs radiation through the crystals 12 to a plurality of photocells 18 each corresponding to one of the members 12. The wave length of the radiation emitted by the source 16 is within the absorption band of the particles in the member 12 when the particles are in the first valence state. Therefore, each photocell 18 is energized by radiation by the source 16 to produce an output of the particles in the crystal of the member 12 corresponding to the photocell 18 are in the second valence state and is not energized by the radiation if the particles are in the first valence state.

An information storage system 20 including an elongate storage member 22 and a writing radiation source 24 is shown in FIG. 3. The member 22 is positioned between a reading radiation source 26 and a plurality of photocells 28. The storage member 22 comprises a semi-conductor crystal having multi-valent particles dispersed through it.

In the use of the system 20, the writing radiation source 24 is operated to control the valence state of particles in distinct portions of the storage member 22, each of which corresponds to one of the photocells 28. This is possible because the valence state of the particles in one portion of the crystal of the member does not affect the valence state of an adjacent portion. Thus, a single crystal receives a plurality of bits of information.

At any time after information is written by the source 24, the reading radiation source 26 is operated to simultaneously direct radiation through the entire storage member 22. The wave length of the radiation is within the absorption band of the particles in the storage member 22 when the particles are in one of their valence states. Therefore, the radiation passes through certain portions of the member 22 and is absorbed by certain other portions. The photocells 28 corresponding to the portions of the storage member that do not absorb radiation are energized to produce an output while the photocells 28 corresponds to the portions of the member that do absorb radiation are not energized and do not produce an output.

As is best shown in FIG. 4, the information storage system according to the present invention is capable of storing images from photographs, holograms and the like. A storage system 30 includes a storage member 32 and a writing radiation source 34. The storage member 32 comprises a semi-conductor crystal having multi-valent particles dispersed through it. The radiation source comprises apparatus for alternately causing the particles of the members 32 to assume each of two valence states.

Images are stored in the storage member 32 by positioning a transparency 36 bearing an image 38 that is opaque to radiation from the source 34 between the source 34 and the storage members 32. The radiation source 34 is then energized to direct radiation through the transparency 36 to the storage member 32. This causes the particles of the storage member 32 that are not aligned with the image 38 to change from one valence state to another, while the particles that are aligned with the image 38 remain in the one valence state. Thus, the image 38 is stored in the member 32 in the form of particles that are in the one valence state.

The average distance between the particles in the storage members 32 are extremely close, i. e., about 10 angstroms. Thus, the resolution of the image stored in the member 32 is excellent. The image in the storage member 32 is subsequently reproduced by subjecting the storage member 32 to radiation having a wavelength within the absorption band of particles in the one valence state. Such radiation is selectively absorbed in a pattern corresponding to the image 38.

It should be understood that the information storage systems shown in FIGS. 2, 3, and 4 are not limited to binary applications. By controlling the duration and intensity of the outputs of the various writing radiation sources of the systems, predetermined percentages of the particles in the various storage members can be changed from one valence state to another. By this means, analog signals and the like can be stored in the storage systems.

Information storage systems employing the present invention are superior to prior systems in several important respects. First, information can be written into and read from such systems entirely by means of electromagnetic radiation. This both simplifies system design and reduces system cost. Second, such systems are capable of storing both analog signals and images from photographs and holograms. Prior systems are generally incapable of performing either of these functions. Third, more than one bit can be stored in a single storage member. This reduces both the size and the cost of storage systems employing the invention. Fourth, because of the spacing of the particles in the crystals, substantial gains in information storage density are realized when the invention is employed.

Although various embodiments of the invention are illustrated in the drawing and described herein, it will be understood that the invention is not limited to the embodiments disclosed but is capable of rearrangement, modification and substitution of parts and elements without departing from the spirit of the invention.

What is claimed is:

1. An information storage system comprising:
   a. a semiconductor crystal having deep-level donors and multi-valent particles incorporated therein;
   b. means for selectively transferring electrons and holes between said donors and said multi-valent particles, thereby causing reciprocal changes in the valence states of the respective donors and multi-valent particles; and
   c. means for determining the respective valence states of said particles and of said donors, including means for measuring the characteristic radiation absorption bands of the respective donors and multi-valent particles, without destruction of the stored information.

2. The information storage system according to claim 1 wherein said semiconductor crystal comprises a Group IIB-VIA compound or a Group III–VA compound doped with a transition metal selected from the group consisting of titanium, vananium, chromium, manganese, iron, cobalt, nickel, and copper.

3. The information storage stystem according to claim 1 wherein said semiconductor is zinc sulfide, said deep-level donor is $Fe^{2+}$ and said multi-valent particle is $Ni^{2+}$.

4. The information storage system according to claim 1 wherein said means for selectively transferring electrons and holes between said donors and said multi-valent particles includes means for directing electromagnetic radiation of a first predetermined wavelength through said crystal to transfer holes from said donors to said particles; and means for directing electromagnetic radiation of a second determined wavelength through said crystal to transfer holes from said multi-valent particles to said donors; and wherein said means for determining the valence state of respective donors and particles includes means for directing electromagnetic radiation of a third predetermined wavelength through said crystal whereby information stored is read-out without destruction of the information stored.

5. The information storage system according to claim 4 wherein said means for directing electromagnetic radiation of a second predetermined wavelength through said crystal includes means sequentially directing said electromagnetic radiation of said second wavelength through different selected portions of said semiconductor crystal.

6. The information storage system according to claim 4 wherein the semiconductor crystal is selected from ZnS, ZnSe, ZnTe, CdS, CdSe, and CdTe.

7. The information storage system according to claim 4 wherein said semiconductor crystal is zinc sulfide, sand deep-level donor is $Fe^{2+}$, said multi-valent particle is $Ni^{2+}$; wherein said first predetermined wavelength is about 5800 A.; wherein said second predetermined wavelength is about 11000 A.; and wherein said third predetermined wavelength is about 8000 A.

8. The information storage system according to claim 4 further including means for selectively changing the valence states of said donors and said particles to their original valence states including means for directing electromagnetic radiation of a fourth predetermined wavelength through said crystal whereby information stored in said system is erased.

9. The information storage system according to claim 8 wherein said fourth predetermined wavelength is less than any of said first, second and third predetermined wavelengths.

* * * * *